United States Patent [19]

Marsh

[11] Patent Number: 5,288,404
[45] Date of Patent: Feb. 22, 1994

[54] SEDIMENTATION

[75] Inventor: Philip Marsh, Hitchin, Great Britain

[73] Assignee: Thames Water Utilities Limited, Reading, United Kingdom

[21] Appl. No.: 966,021

[22] PCT Filed: Jun. 24, 1991

[86] PCT No.: PCT/GB91/01013

§ 371 Date: Dec. 21, 1992

§ 102(e) Date: Dec. 21, 1992

[87] PCT Pub. No.: WO92/00131

PCT Pub. Date: Jan. 9, 1992

[30] Foreign Application Priority Data

Jun. 22, 1990 [GB] United Kingdom ............... 90140146

[51] Int. Cl.$^5$ ...................... B01D 21/02; B01D 21/24
[52] U.S. Cl. ..................... 210/519; 210/522; 210/525; 210/540
[58] Field of Search ............... 210/519, 521, 522, 525, 210/527, 528, 532.1, 540

[56] References Cited

U.S. PATENT DOCUMENTS

| 3,346,122 | 10/1967 | Cornelissen | 210/522 |
| 3,768,648 | 10/1973 | Anderson et al. | 210/522 |
| 3,797,668 | 3/1974 | Piakenrood et al. | 210/522 |
| 4,034,526 | 1/1987 | Salkeld et al. | 210/521 |
| 4,290,887 | 9/1981 | Brown et al. | 210/525 |

FOREIGN PATENT DOCUMENTS

| 1253674 | 11/1967 | Fed. Rep. of Germany . |
| 994118 | 11/1951 | France . |
| 2400939 | 3/1979 | France . |
| 242594 | 10/1946 | Switzerland . |
| 2039873 | 8/1980 | United Kingdom . |

OTHER PUBLICATIONS

Korrespondenz Abwasser vol. 31, Feb. 1984, pp. 104–111; H. Schade et al: 'Parallelplattenabscheider'.

Primary Examiner—Christopher Upton
Attorney, Agent, or Firm—Chilton, Alix & Van Kirk

[57] ABSTRACT

The invention relates to apparatus for separating constituents of a liquid containing solids, comprising an upflow inlet for a liquid mixture into a central stilling chamber, a pair of separator units having a plurality of baffle plates extending in opposite directions at an upward angle from the stilling chamber, lighter constituent removal means above each separator unit, and a heavier constituent outlet in the stilling chamber.

18 Claims, 6 Drawing Sheets

ACTUATED VALVE

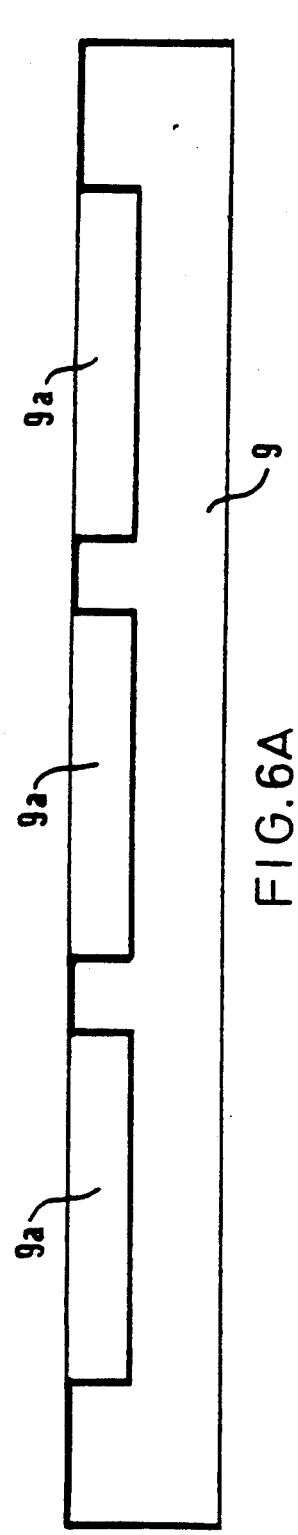
FIG.6A
FIG.6B

SEDIMENTATION

The invention relates to sedimentation apparatus, particularly primary and final sedimentation in wastewater treatment.

At present, sedimentation is usually carried out in large tanks, suitably of concrete, of various shapes, designed to retain liquid flow for periods of between two to six hours and where the particles must settle through depths of 2.5 to 4.5 meters.

The construction of such tanks requires considerable land area and excavation. Also the large volumes required tend to preclude the use of construction materials other than concrete. All of these factors make for a high cost on installation and maintenance.

It is accordingly an object of the invention to seek to provide an improved separation apparatus.

According to the invention there is provided apparatus for separating constituents of a liquid containing solids, comprising an inlet for the liquid, and a flow path leading from the inlet including separator means, having a plurality of baffle plates through which the liquid is arranged to flow in an upwardly inclined path whereby to separate heavier constituents from lighter constituents of the mixture, the flow path being bifurcated into two sections which each include separator means, each separator means having a downstream and an upstream outlet respectively for lighter and heavier constituents of the liquid, characterised in that the inlet is between two separator means (3,4) and is directed to the surface of the liquid away from a common outlet (6) for heavier constituents of the liquid, in that the respective downstream outlets (9) are for lighter constituents, and in that the respective upstream outlets lead to the common outlet (6).

The separator means may each comprise an array of substantially parallel spaced apart plates arranged to provide a laminar flow therebetween. This provides for separation of the constituents.

The separation of the plates may suitably be in the range 50-100 mm. This provides for efficient separation of constituents of the mixture.

The angle of inclination of the plates may be in the range 55°-60° to the horizontal, to provide for sufficient contact time during separation.

The ratio of plate length to plate separation may preferably be approximately 20. This provides for a sufficient contact area.

The plates may each be corrugated and may be spaced apart by the corrugations whereby to provide an array which may have a honeycomb-like configuration in end elevation. This provides for construction using a plurality of corrugated plate members.

Each separator means may be removably mounted in the apparatus.

The flow path may comprise a plurality of separate feed means whereby to feed the mixture to the apparatus in a direction away from the common outlet. This provides for a passage through the apparatus without substantial turbulence.

The inlet may provide a conduit comprising the outlet for the lighter constituents, which conduit may comprise a blanked off part of an inlet pipe.

The outlet for the light constituents also may comprise a collector for those constituents intermediate the downstream end of the separator means and the conduit.

The collector may comprise a tube with longitudinally spaced inlet ports formed therein.

The apparatus may include a channel for collecting scum from the liquid, and, suitably, means periodically to allow scum to pass to the scum channel. This helps to obviate the build-up of scum in the apparatus.

The means may comprise a valve operable to raise the level of the liquid in the apparatus whereby to allow scum to pass to the scum channel.

There may be a stirrer device to stir heavier constituents adjacent the common outlet. This helps to ensure smooth flow through the apparatus.

There may also be a further device for urging scum towards the scum channel, which further device may comprise a reciprocable blade member.

The further device may comprise the reciprocable blade member and a cam to which the blade member is attached, and the cam may be mounted on a rotatable rod of the stirrer device.

Apparatus for separating constituents of a liquid containing solids is hereinafter described, by way of example, with reference to the accompanying drawings.

FIGS. 6A and 6B show respectively a side elevational and plan view of a collector for lighter constituents.

Figure 1:
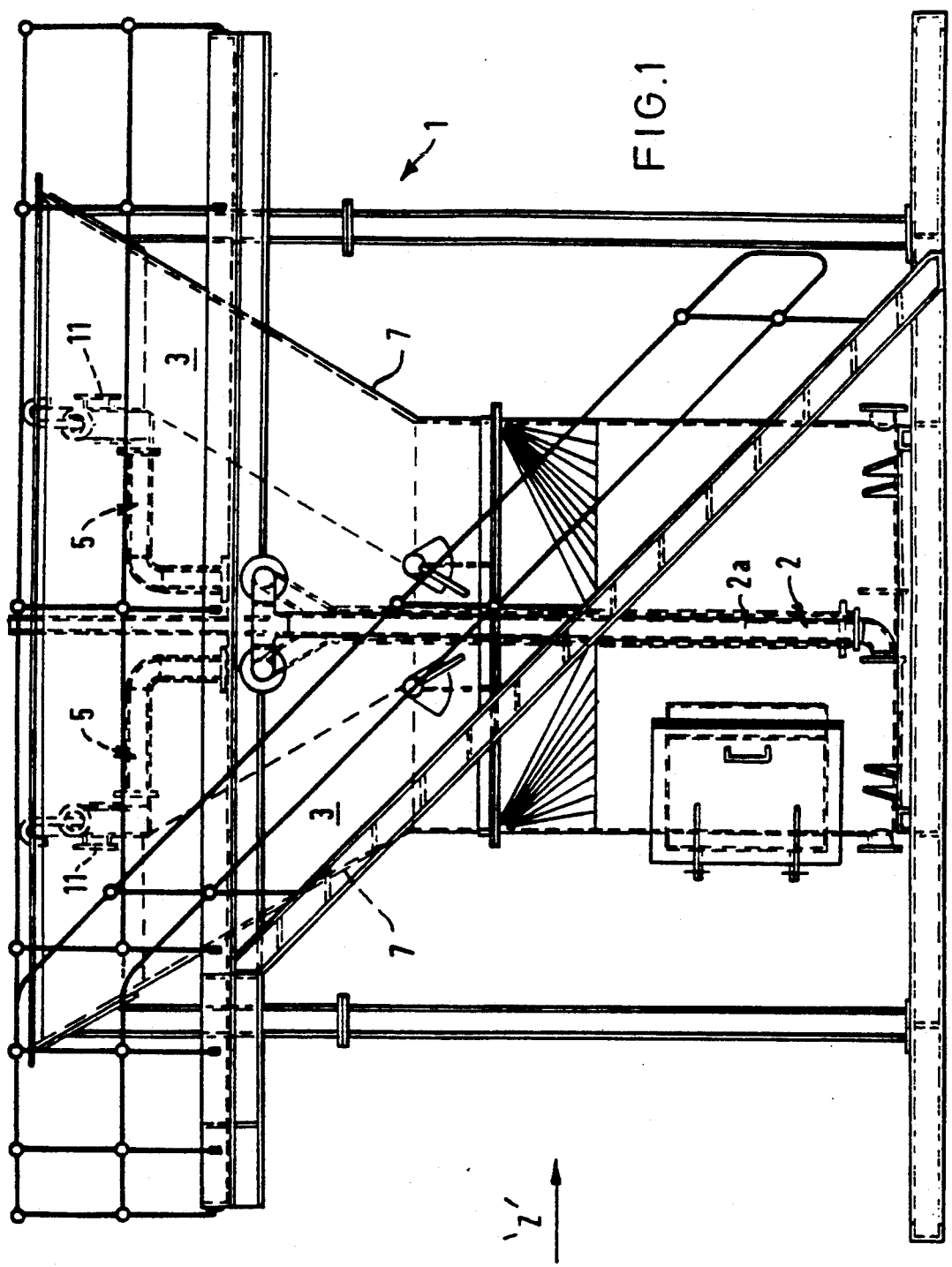
FIG. 1 is an elevational view of the apparatus according to the invention, in the form of a primary sedimentation tank or vessel for separating solids from sewage.
Figure 2:
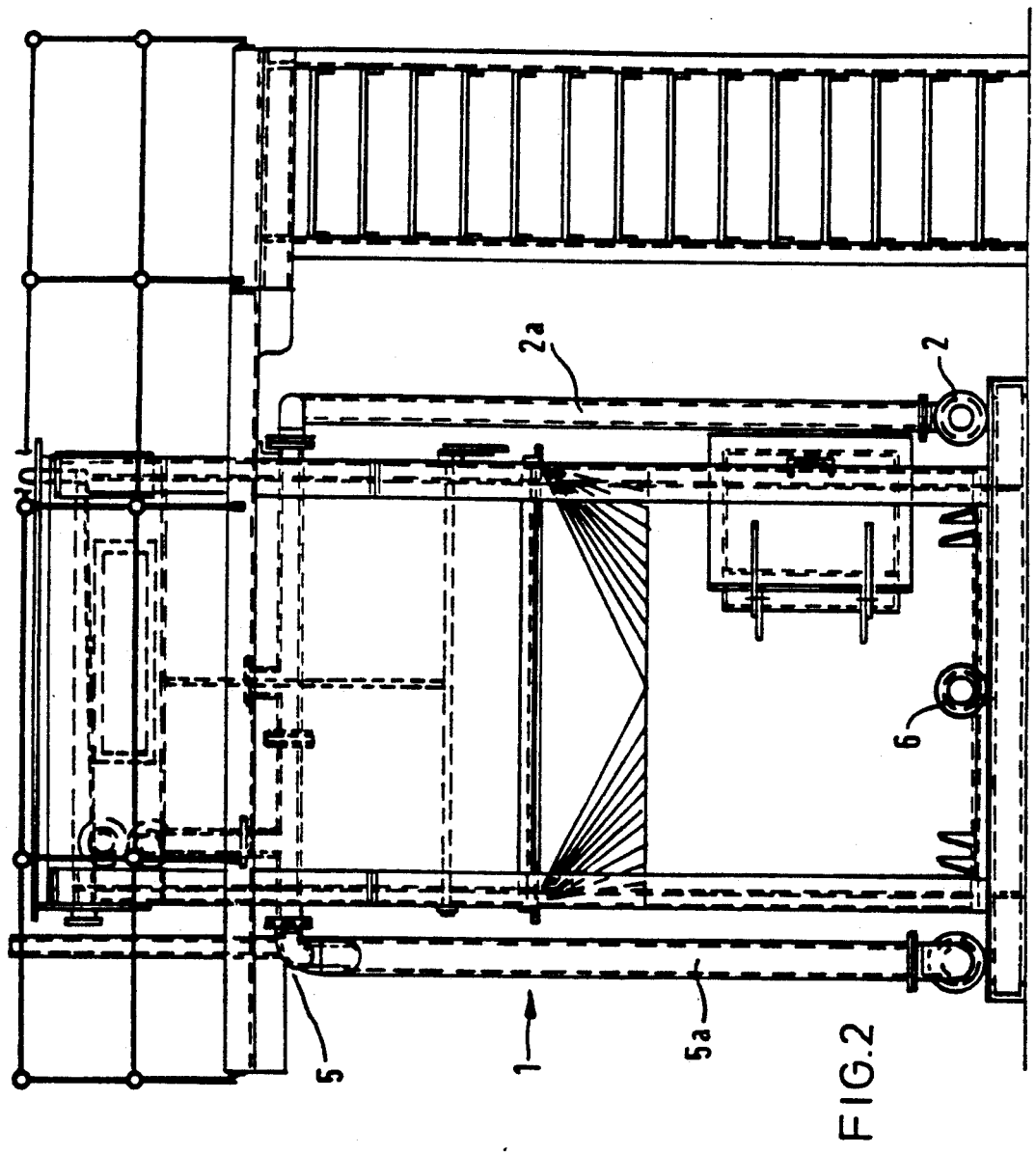
FIG. 2 is an elevational view of the apparatus of FIG. 1 as seen in the direction of arrow "Z" in FIG. 1.
Figure 3:
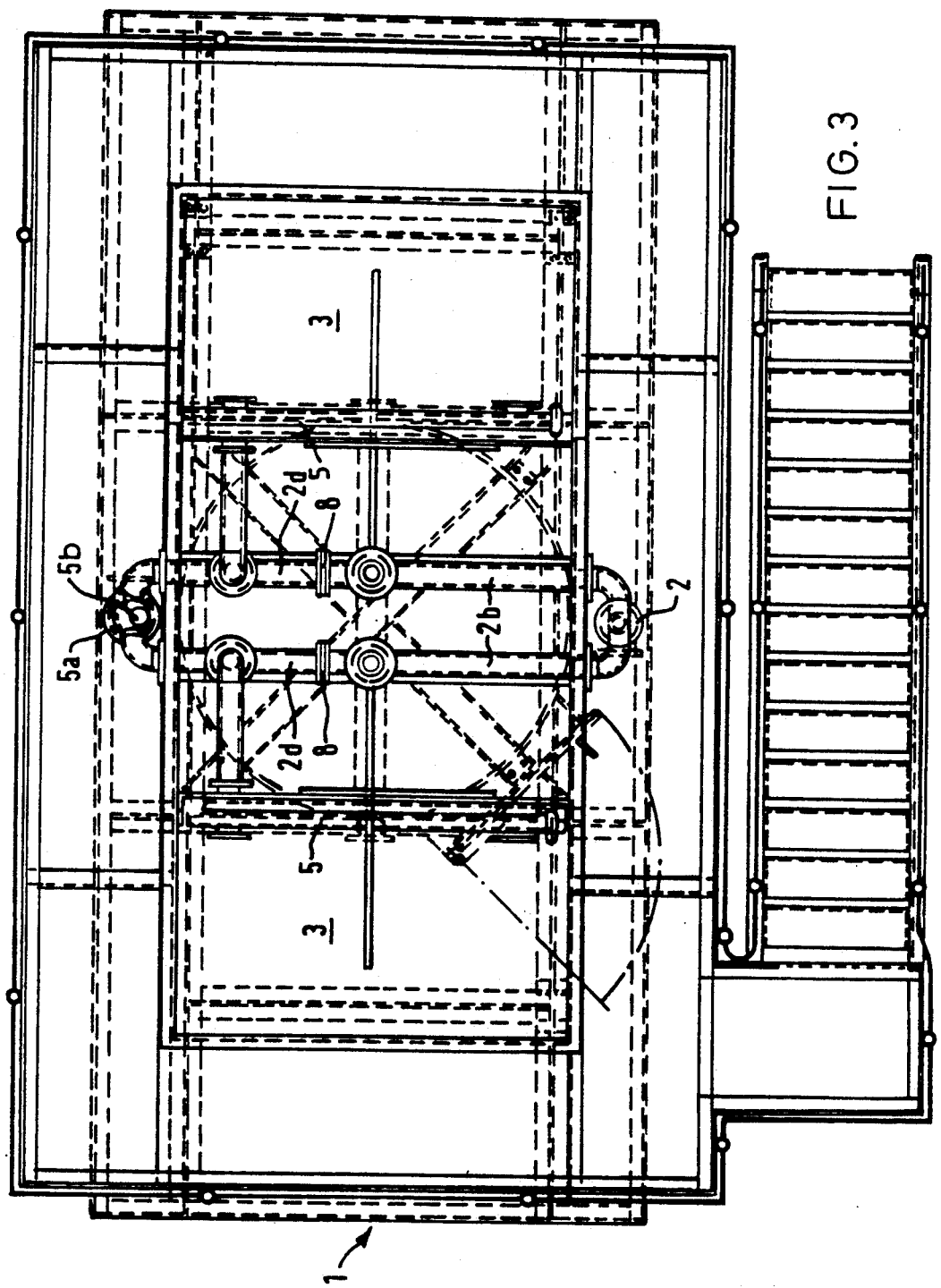
FIG. 3 is a top plan view of the apparatus of FIGS. 1 and 2.
Figure 4:
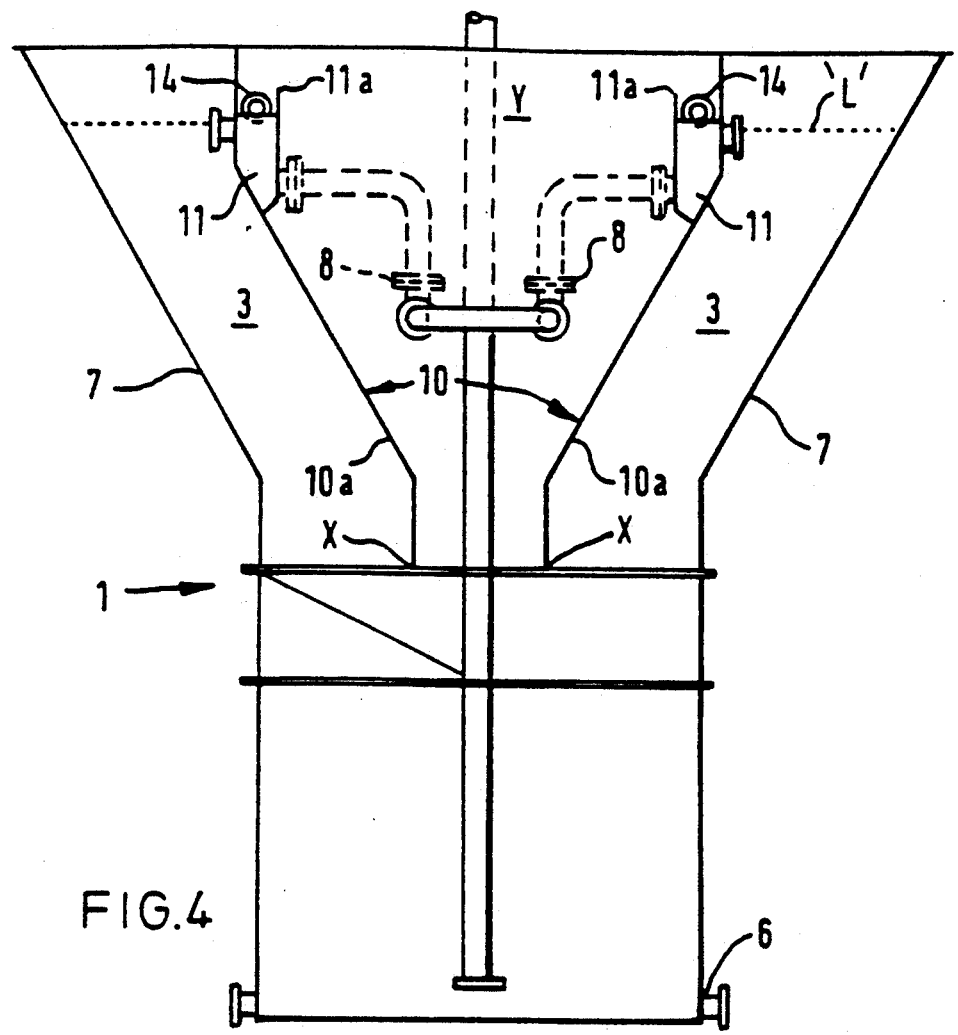
FIG. 4 is a schematic side elevational view of the apparatus of FIGS. 1-3 with parts omitted for clarity.

Referring to the drawings there is shown apparatus for separating constituents of a liquid containing solids, comprising an inlet for the liquid, an outlet for the liquid and a flow path leading from the inlet including separator means, having a plurality of baffle plates through which the liquid is arranged to flow in an upwardly inclined path whereby to separate heavier constituents from lighter constituents of the mixture, characterised in that the flow path is bifurcated into two sections, in that the two sections each include separator means (3,4), in that each separator means has a downstream and an upstream outlet respectively for lighter and heavier constituents of the liquid in that the respective downstream outlets lead to respective outlets (9) for lighter constituents and in that the respective upstream outlets lead to a common outlet (6) for heavier constituents of the liquid.

The apparatus shown is essentially an open-topped vessel, tank or container (1), the inlet (2) for raw sewage to be separated into its lighter and heavier (sludge) comprising a riser feed (2a) which splits at the upper (as viewed) open end of the vessel into two transverse pipes (2b) which extend across the open top of the vessel, which is rectangular with inclined sides (7) and leads to a circular bottom part which has the outlet (6) at the bottom for sludge. The transverse pipes (2b) are substantially horizontal in use and each has a bifurcated upstand (2c) in the form of two open pipes which point in a direction away from the common outlet (6) and out of which the sewage passes into the vessel. The four entry pipes point upwards just below the surface. The surface area at this point is large so velocities are low and enables light "scum" particles to float to the surface.

The sewage then flows downward accelerating to a maximum at the bottom of a stilling chamber. The flow then splits into two to flow up the plate arrays.

Because the flow area through the plate arrays is twice that through the bottom of the stilling chamber the velocity is halved. Also there is a change of direction of flow from downwards to upwards which produces a momentary zero velocity. Because of the low velocities in this region and by virtue of their momentum, larger particles carry on down to the sludge hopper. Because the majority of larger particles do not enter the plate arrays blockages are not a problem.

Figure 5:
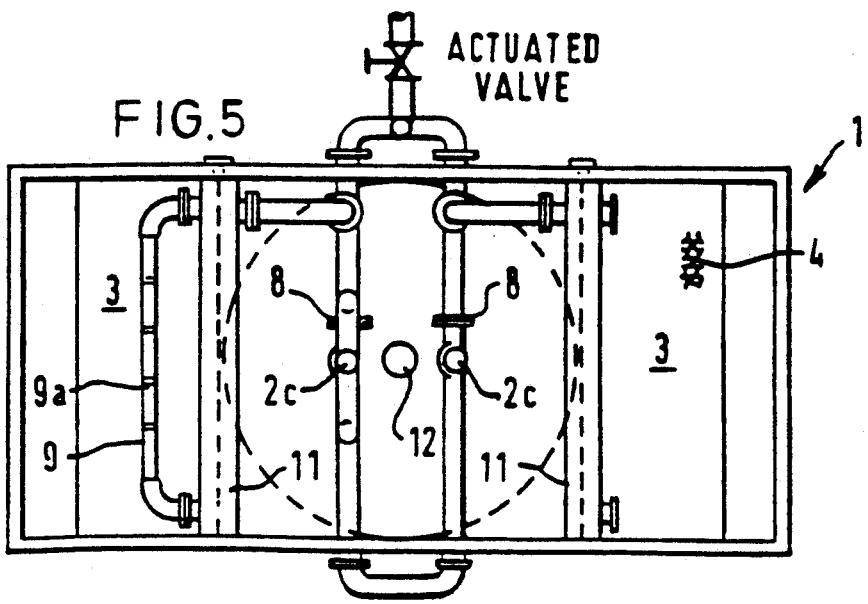
FIG. 5 is a schematic top plan view of the apparatus FIGS. 1-4 with parts omitted for clarity.
Figure 7:
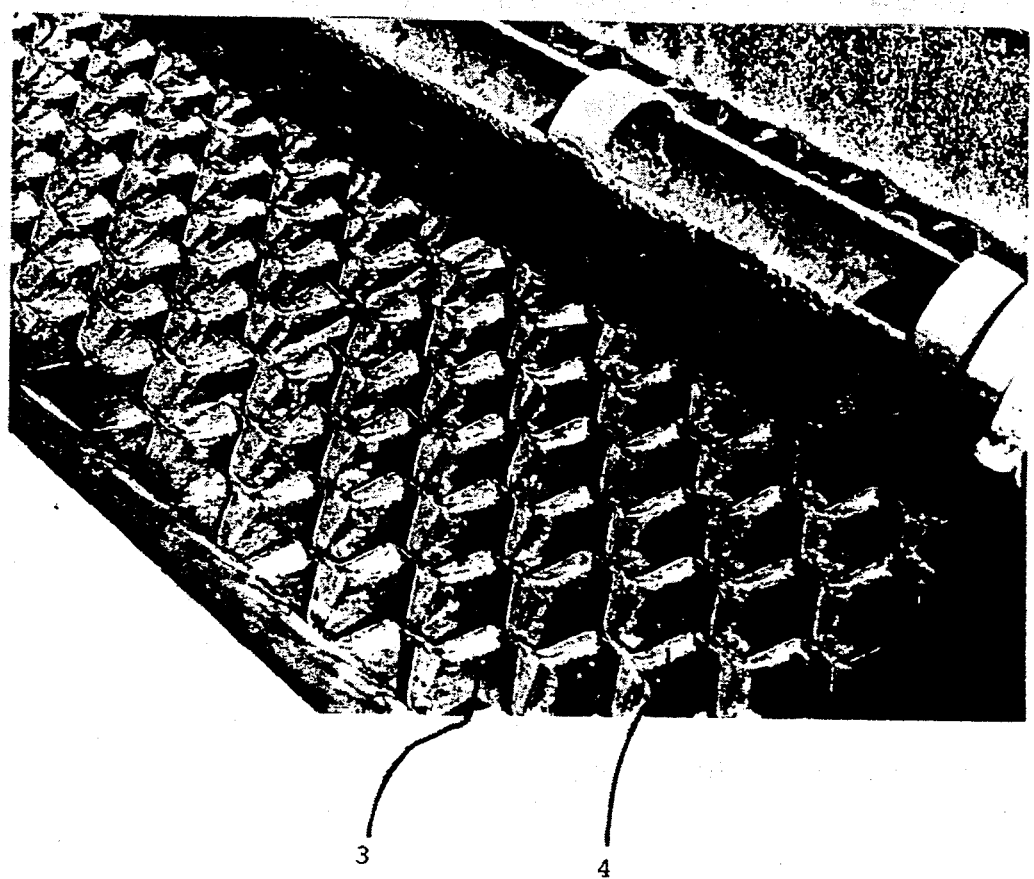
FIG. 7 shows a perspective view of one embodiment of a lamella plate separator of the apparatus.

The horizontal transverse pipes (2b) are blanked off as by plate inserts (8) downstream of the respective bifurcated upstands 2c and receive separated light constituents of the sewage from collectors (9) thereof (only one is shown in FIG. 5), the light constituents then passing to a common down pipe (5a) for removal for further processing, there being an air bleed (5b) at the top of the down pipe.

The walls (7) of the upper part taper downwardly towards one another at an angle of inclination in the embodiment of 60°, though the angle may be in the range 55°-60°.

Internally of the top part of the vessel there are internal walls (10) which are transverse and extend into the vessel (1) to the position "X" shown. the walls have an inclined part (10a) parallel to the external walls, and which form two housings, each open at the top and bottom as viewed and in which is received respectively a separator (3) in the form of an array of spaced apart parallel plates (4) substantially parallel to each other and to the walls (7), (10a). The array (3) comprises an assembly of corrugated plastic plates like roofing plate lights which abut at "hills" and "valleys" which they are joined as by means such as nuts and bolts to form a stable array. The array may be mounted in a frame of say metal whereby it can be removably mounted in the vessel.

Adjacent the top (as viewed) or downstream end of each separator there is the respective collector (9) for the lighter constituents of the sewage, comprising a transverse pipe of say plastic which has longitudinally spaced apart ports (9a) through which the lighter constituents enter the collectors 9. The collectors (9) in turn are connected by suitable conduiting with the blanked off parts (2d) of the transverse pipes (2b).

There are also scum channels (11) extending transversely of the vessel and having a weir or lip (11a) slightly higher than the normal liquid level "L" and over which scum can pass in a manner to be described. The weirs or lips (11a) may be castellated and/or variable in inclination, though vertical ones as shown are preferred.

Passing centrally down the vessel, between the pipes' (2b), (2d), is a rotatable rod (12) which supports at its lower end (as viewed) a stirrer device (not shown) in the form of a picket fence which helps to obviate stratification in the sludge adjacent the outlet.

Adjacent the surface "L" of the liquid is a scum separator or sweep device which reciprocates across the surface in order to "sweep" scum into the scum channels. The device is in the form of a blade carried by an eccentric cam device mounted on the rotatable rod (12) of the stirrer device so that as the rod rotates, the sweep device reciprocates across the surface as described.

The plates in the array of plates comprising each separator have a separation of 60 mm, and the ratio of plate length to plate separation is 20.

It will be understood that the area Y between the separators and leading to the circular is the stilling chamber.

In use to separate heavier, sludge, constituents from sewage, crude sludge enters the vessel via the four pipes (2c) and fills the vessel up, the liquid sewage settling out into the lower part. As the volume of liquid in the vessel increases, the crude sludge is forced upwardly through both separators (3), in other words the flow splits into two flow sections and passes upwardly through the two separators. The spacing of the plates is such that laminar flow is maintained. During the flow through the separators, heavier sludge constituents separate out and fall under gravity downwardly against the flow of sewage and drop into the lower sludge tank. As they fall down the plates they pick up and carry with them smaller sludge particles entering the arrays. The lighter constituents, usually liquid with only finer suspended solids, is able to pass out of the top of the separators 3 where, downstream thereof, it passes through the ports (9a) into the tubes (9) for passage via the blanked of parts (2d) of the pipes (2) to the exit pipes (5).

From time to time there is a build up of scum on the surface, which has to be removed. This is achieved by automatically closing a valve (as shown in FIG. 5) at the outlet of the effluent for a minute or two so that on continued flow of crude sewage into the vessel, the liquid "L" level rises high enough for the scum, which floats on the surface, to pass into the scum channels (11) over the respective weirs (11a) for carriage away through pipes (14). The valve is opened when the scum has been cleared, to lower the liquid level again. It will be understood too that the scum sweep device assists by urging the scum to the sides, adjacent the channels prior to removal; in this regard, operation is not continuous as the stirrer is not operated continuously, but only when the sludge is pumped out of the outlet using a pump.

Using the invention, it is possible to provide a throughput of sewage as a primary sedimentation step, at a rate of 30 m$^3$ h$^{-1}$, and this can achieve sludge concentrations of up to 3%, compared to about 0.5% with conventional lamella tanks, it being understood that raw sewage concentrate is about 0.03%.

It will also be understood the apparatus embodying the invention and defined herein is of a modular construction and can be erected as desired where a treatment vessel is required.

I claim:

1. Apparatus for separating constituents of a liquid containing solids, comprising a central stilling chamber having an upflow inlet for the liquid in the upper portion and an outlet for heavier constituents proximate the bottom; a pair of separator means, each having a plurality of baffle plates in a housing through which the liquid is arranged to flow in upwardly inclined paths extending in opposite directions from said stilling chamber to upper areas separated from said stilling chamber by walls, to separate heavier constituents from lighter constituents of the mixture, and means in the upper area above each separator housing for receiving lighter constituents.

2. Apparatus according to claim 1, wherein the separator means each comprise an array of substantially parallel spaced apart plates arranged to provide a laminar flow therebetween.

3. Apparatus according to claim 2, wherein the separation of the plates is in the range 50-100, mm.

4. Apparatus according to claim 3, wherein the angle of inclination of the plates is in the range 55°-60° to the horizontal.

5. Apparatus according to claim 3, wherein the ratio of plate length to plate separation is approximately 20.

6. Apparatus according to claim 2, wherein the plates are each corrugated and are spaced apart by the corrugations whereby to provide an array having an honeycomb-like configuration in end elevation.

7. Apparatus according to claim 1, wherein each separator means is removably mounted in the apparatus.

8. Apparatus according to claim 1, wherein the inlet comprises a plurality of separate feed means having upflow outlets to feed the mixture to the apparatus in a direction away from the heavy constituent outlet.

9. Apparatus according to claim 8, wherein the inlet is in the form of pipes, each separated into an inlet section and an outlet section connected to the lighter constituent receiving means.

10. Apparatus according to claim 9, wherein the sections are separated by plate inserts.

11. Apparatus according to claim 1, wherein the lighter constituent receiving means comprise a tubes with longitudinally spaced inlet ports formed therein.

12. Apparatus according to claim 1, further comprising a channel for collecting scum from the liquid in the stilling chamber.

13. Apparatus according to claim 12, further comprising control means to periodically allow scum to pass to the scum channel.

14. Apparatus according to claim 13, wherein the control means comprises a valve operable to raise the level of the liquid in the vessel whereby to allow scum to pass to the scum channel.

15. Apparatus according to claim 12, further comprising a stirrer device to stir heavier constituents adjacent the heavier constituent outlet.

16. Apparatus according to claim 15, further comprising means for urging scum towards the scum channel.

17. Apparatus according to claim 16, wherein the scum urging means comprises a reciprocable blade member.

18. Apparatus according to claim 17, wherein the reciprocable blade member is attached to a cam mounted on a rotatable rod of the stirrer device.

* * * * *

UNITED STATES PATENT AND TRADEMARK OFFICE
CERTIFICATE OF CORRECTION

PATENT NO. : 5,288,404
DATED : February 22, 1994
INVENTOR(S) : Philip Marsh

It is certified that error appears in the above-indentified patent and that said Letters Patent is hereby corrected as shown below:

Column 6, line 2, delete "a".

Signed and Sealed this

Seventh Day of January, 1997

Attest:

BRUCE LEHMAN

Attesting Officer

Commissioner of Patents and Trademarks